(12) United States Patent
Yang et al.

(10) Patent No.: US 8,588,370 B2
(45) Date of Patent: *Nov. 19, 2013

(54) ARTICLE INSPECTION DEVICE AND INSPECTION METHOD

(75) Inventors: Yigang Yang, Beijing (CN); Tiezhu Li, Beijing (CN); Qinjian Zhang, Beijing (CN); Yi Zhang, Beijing (CN); Yingkang Jin, Beijing (CN); Qinghao Chen, Beijing (CN); Yuanjing Li, Beijing (CN); Yinong Liu, Beijing (CN)

(73) Assignees: Tsinghua University, Beijing (CN); Nuctech Company Limited, Beijing (CN)

(*) Notice: Subject to any disclaimer, the term of this patent is extended or adjusted under 35 U.S.C. 154(b) by 239 days.

This patent is subject to a terminal disclaimer.

(21) Appl. No.: 13/142,511

(22) PCT Filed: Dec. 29, 2010

(86) PCT No.: PCT/CN2010/080424
§ 371 (c)(1),
(2), (4) Date: Jun. 28, 2011

(87) PCT Pub. No.: WO2012/000299
PCT Pub. Date: Jan. 5, 2012

(65) Prior Publication Data
US 2012/0002788 A1     Jan. 5, 2012

(30) Foreign Application Priority Data
Jun. 30, 2010 (CN) .......................... 2010 1 0223342

(51) Int. Cl.
*G01N 23/201* (2006.01)
(52) U.S. Cl.
USPC .......................................................... 378/88
(58) Field of Classification Search
USPC ............................................... 378/70, 86–90
See application file for complete search history.

(56) References Cited

U.S. PATENT DOCUMENTS

| | | |
|---|---|---|
| 7,078,699 B2 | 7/2006 | Seppi |
| 2009/0168958 A1 | 7/2009 | Cozzini et al. .................. 378/57 |
| 2012/0002788 A1 | 1/2012 | Yang et al. |

FOREIGN PATENT DOCUMENTS

| | | |
|---|---|---|
| CA | 1 135 878 | 11/1982 |
| CN | 1 343 883 A | 4/2002 |

(Continued)

OTHER PUBLICATIONS

Search Report and Written Opinion from corresponding application PCT/CN2010/080424, dated Apr. 21, 2011, 6 pgs.

(Continued)

*Primary Examiner* — Irakli Kiknadze
(74) *Attorney, Agent, or Firm* — Westman, Champlin & Koehler, P.A.

(57) ABSTRACT

The present invention discloses an article inspection device, comprising: a x-ray machine, a collimation unit, a transmission detector array and at least one scattering detector array. Each of the at least one scattering detector array comprising a plurality of same scattering detector modules arranged in a matrix of i-rows and j-columns. A transmission cross section of the article transmitted by the x-rays is divided into a plurality of same sub-regions arranged in a matrix of i-rows and j-columns. The plurality of scattering detector modules arranged in i-rows and i-columns correspond to the plurality of sub-regions arranged in i-rows and j-columns one by one for detecting pair production effect annihilation photons and Compton-effect scattering photons from the respective sub-regions. Obtaining atomic numbers of the respective sub-regions based on a ratio of the pair production effect annihilation photon count to the Compton-effect scattering photon count, so as to form a three-dimensional image of the article. In addition, the present invention further discloses an article inspection method.

18 Claims, 8 Drawing Sheets

(56) References Cited

FOREIGN PATENT DOCUMENTS

| | | |
|---|---|---|
| CN | 1356540 A | 4/2002 |
| CN | 1 875 264 A | 12/2006 |
| CN | 101629917 A | 1/2010 |
| SU | 707403 | 6/1981 |
| WO | 2007054837 A3 | 5/2007 |

OTHER PUBLICATIONS

"The γ Ray Attenuation and Scattering in the Coal and the Correction of Neutron Induced Prompt γ Spectra", by Y. Yang et al., Nuclear Electronics & Detection Technology, vol. 23, No. 2, Mar. 2003, pp. 142-146 including translation of Abstract.

Office Action from Chinese Application No. 201010223292.7, dated Jul. 20, 2012.

Search Report and Written Opinion from application PCT/CN2010/080369, dated Mar. 31, 2011, 6 pgs.

Prosecution Documents associated with U.S. Appl. No. 13/142,712 including: Amendment filed Oct. 4, 2012; Office Action mailed Jul. 6, 2012.

ARTICLE INSPECTION DEVICE AND INSPECTION METHOD

CROSS-REFERENCE TO RELATED APPLICATION

This Application is a Section 371 National Stage Application of International Application No. PCT/CN2010/080424, filed Dec. 29, 2010, not yet published, which claims the benefit of Chinese Patent Application No. 201010223342.1 filed on Jun. 30, 2010 in the State Intellectual Property Office of China, the whole content/disclosures of which are incorporated herein by reference.

BACKGROUND OF THE INVENTION

1. Field of the Invention

The present invention relates to an article inspection device for inspecting dangerous goods, such as explosives, chemicals, biological weapons, nuclear materials and drugs, hidden in an article. In addition, the present invention also relates to an article inspection method.

2. Description of the Related Art

In order to detect dangerous goods, such as explosives, chemicals, biological weapons, nuclear materials and drugs, hidden in a ship container or in an air container, many technical solutions have been proposed, for example, two popular solutions of which are an x-ray inspection technology and a neutron inspection technology, which are simply described as follows:

1. The X-Ray Inspection Technology a) X-Ray Transmission Solution

The conventional x-ray transmission solution includes a monoenergetic x-ray transmission method and a polyenergetic x-ray transmission method. In each of the methods attenuation information of x-rays transmitting through an article to be inspected is firstly detected by use of a transmission detector array, and then a two-dimensional image of the article is formed based on the attenuation information. The two-dimensional image is representative of mass thickness information of the article along the x-rays transmission path. In this way, by analyzing the shape of the two-dimensional image, an operator can determine whether the article contains dangerous goods therein or not. However, the x-ray transmission solution only can obtain an integration of attenuation ability of the article to be inspected along the x-rays transmission path, thereby it can not discriminate a thinner article having a high atomic number and a high atomic density from a thicker article having a low atomic number and a low atomic density. Therefore, it can not detect nuclear materials hidden in the article with enough accuracy.

b) Nuclear Resonance Fluorescence Solution

The conventional nuclear resonance fluorescence solution comprises firstly adopting x-rays to excite an atomic nucleus, and then detecting gamma photons generated by the atomic nucleus after being excited. In this way, the conventional nuclear resonance fluorescence solution can obtain "fingerprint" information of the atomic nucleus of interest. However, the x-rays that can generate resonance absorption have a very small energy spectrum width, which causes the article to generate a few number of resonance fluorescence but a great number of scattering photons after being irradiated by the x-rays, thereby the conventional nuclear resonance fluorescence solution is disadvantageously interfered by background information from the scattering photons, and has a poor inspection sensitivity. For the purpose of improving the inspection sensitivity, another method of using an adjustable monoenergetic x-ray source is recently proposed, but it needs an electron accelerator with energy of more than 100 MeV.

2. The Neutron Inspection Technology a) Neutron Transmission Solution

The conventional neutron transmission solution is similar with the above conventional x-ray transmission solution. The neutron is sensitive to materials having a low atomic number, particularly hydrogen, but usually is not sensitive to those having a high atomic number. Thereby, compared with the above conventional x-ray transmission solution, the conventional neutron transmission solution is suitable for detecting materials containing a great deal of hydrogen. However, the neutron transmission solution also can only obtain integration information along the neutron transmission path, thereby it can not discriminate chemical elements of materials arranged at various spatial locations. Therefore, it can not detect nuclear materials hidden in the article, either.

b) Elements Concentration Analysis Solution

The elements concentratioin analysis solution can discriminate different elements based on gamma rays induced by reaction of neutrons with nuclear. Furthermore, another elements analysis solution that can discriminate different elements arranged in three-dimensional space is recently proposed, wherein a three-dimensional space element image of an article to be inspected, such as a container or a vehicle, can be formed in a 5 cm×5 cm×5 cm spatial resolution. However, the elementary analysis solution only can be adapted to nuclides having a large neutron reaction cross section, such as Nitrogen, Carbon, Oxygen and Hydrogen, and can not be adapted to nuclear elements having a small neutron reaction cross section. In addition, in the elementary analysis solution, it needs to detect energy spectra of y-rays with high temporal and energy resolution; Because of the very complicated y-rays spectra induced by the neutron reactions with matter, it is very hard to interpret spectra and extract elements concentration information. Also, the neutron generator should produce neutron pulse of nanosecond width, this is very difficult.

In addition to the above two conventional inspection methods, there are a few of other methods, for example, a nuclear quadrupole resonance (NQR) solution. The NQR method is sensitive to a molecule and can get "fingerprint" information of the molecule. But a condition must be satisfied that the molecule must contain a nucleus whose quadrupole moment is not zero and an electric field gradient in which the atomic nucleus is located must be rather large. However, only a few of materials can satisfy with the above condition. Furthermore, NQR does not work well if the inspected object is electromagnetically shielded.

SUMMARY OF THE INVENTION

The present invention has been made to overcome or alleviate at least one aspect of the above mentioned disadvantages.

Accordingly, it is an object of the present invention to provide an article inspection device and an inspection method that can easily form a three-dimensional image for the article.

According to an aspect of the present invention, there is provided an article inspection device, comprising:

a x-ray machine;

a collimation unit for shaping x-rays generated by the x-ray machine into a sector beam to project an article;

a transmission detector array for detecting the x-rays transmitting through the article so as to form a two-dimensional image of the article; and at least one scattering detector array each comprising a plurality of same scattering detector modules arranged in a matrix of i-rows and j-columns, wherein a transmission cross section of the article transmitted by the x-rays is divided into a plurality of same sub-regions arranged in a matrix of i-rows and j-columns, wherein the plurality of scattering detector modules arranged in i-rows and j-columns correspond to the plurality of sub-regions arranged in i-rows and j-columns one by one for detecting annihilation photons and Compton-effect scattering photons from the respective sub-regions produced by the x-rays, wherein obtaining atomic numbers of the respective sub-regions based on a ratio of the annihilation photon count to the Compton-effect scattering photon count, so as to form a three-dimensional image of the article, wherein 'i' is a positive integer equal to or greater than 2, and 'j' is a positive integer equal to or greater than 2.

In an exemplary embodiment according to the present invention, the article inspection device comprises two scattering detector arrays composed of: a first scattering detector array having a plurality of same first scattering detector modules arranged in a matrix of i-rows and j-columns; and a second scattering detector array having a plurality of same second scattering detector modules arranged in a matrix of i-rows and j-columns.

In another exemplary embodiment according to the present invention, the article inspection device further comprises:

a plurality of coincidence counters corresponding to the plurality of sub-regions arranged in i-rows and j-columns one by one, wherein when one of the first scattering detector modules and one of the second scattering detector modules corresponding to a same one sub-region 'almost simultaneously' receive the photon from the same one sub-region, the coincidence counter corresponding to the same one sub-region is added by '1', wherein the term 'almost simultaneously' means that the time difference between a time when the first scattering detector module receives the photon and a time when the second scattering detector module receives the photon is within a predetermined range; and a plurality of first scattering counters corresponding to the plurality of sub-regions arranged in i-rows and j-columns one by one, wherein when one of the first scattering detector modules corresponding to one sub-region receives the photon from the one sub-region, the first scattering counter corresponding to the one sub-region is added by '1'.

In another exemplary embodiment according to the present invention, the article inspection device further comprises: a plurality of second scattering counters corresponding to the plurality of sub-regions arranged in i-rows and j-columns one by one, wherein when one of the second scattering detector modules corresponding to one sub-region receives the photon from the one sub-region, the second scattering counter corresponding to the one sub-region is added by '1'.

In another exemplary embodiment according to the present invention, wherein the first scattering detector module and the second scattering detector module corresponding to the same one sub-region are respectively connected to a first constant timing discriminator and a second constant timing discriminator for converting a first analog signal detected by the first scattering detector module and a second analog signal detected by the second scattering detector module into a first time signal and a second time signal;

the first time signal and the second time signal are respectively input to the first scattering counter and the second scattering counter corresponding to the same one sub-region;

the first time signal and the second time signal are both input to a time coincidence circuit corresponding to the same one sub-region, the time coincidence circuit determining whether the first time signal and the second time signal are 'almost simultaneously' input to it; and when the first time signal and the second time signal are 'almost simultaneously' input to the time coincidence circuit, the time coincidence circuit outputs a time coincidence signal to the coincidence counter corresponding to the same one sub-region.

In another exemplary embodiment according to the present invention, wherein the ratio of the pair production effect annihilation photon count to the Compton-effect scattering photon count is calculated by a following formula (1) or a following formula (2):

$$Zpc=(Pair1/\epsilon\_pair)/[(PB11-Pair1/\epsilon\_pair)/\epsilon\_b] \quad (1)$$

$$Zpc=(Pair1/\epsilon\_pair)/[(PC11-Pair1/\epsilon\_pair)/\epsilon\_c] \quad (2)$$

wherein,

Zpc is the ratio of the pair production effect annihilation photon count to the Compton-effect scattering photon count;

Pair1 is the coincidence counter count;

$\epsilon\_pair$ is a detection efficiency of the first and second scattering detector modules to the pair production effect annihilation photons;

PB11 is the first scattering counter count;

$\epsilon\_b$ is a detection efficiency of the first scattering detector module to the Compton-effect scattering photons;

PC11 is the second scattering counter count;

$\epsilon\_c$ is a detection efficiency of the second scattering detector module to the Compton-effect scattering photons, In another exemplary embodiment according to the present invention, each of the first scattering detector modules is same as each of the second scattering detector modules; and each of the scattering detector modules comprises:

a detector; and a collimator for absorbing the pair production effect annihilation photons and the Compton-effect scattering photons from other sub-regions not corresponding to the collimator to permit only the pair production effect annihilation photons and the Compton-effect scattering photons from the one sub-region corresponding to the collimator to enter the detector.

In another exemplary embodiment according to the present invention, the detector is a plastic scintillator detector, a liquid scintillator detector, a $LaBr_3(Ce)$ detector, a $LaCl_3(Ce)$ detector, a HPGe detector or a CdZnTe detector, In another exemplary embodiment according to the present invention, the collimator is made of lead, steel or copper.

In another exemplary embodiment according to the present invention, each of the scattering detector modules further comprises: a shield for preventing the pair production effect annihilation photons and the Compton-effect scattering photons, from sub-regions not corresponding to the collimator of the scattering detector module, from entering the detector.

In another exemplary embodiment according to the present invention, the shield is made of lead, steel or copper.

In another exemplary embodiment according to the present invention, each of the scattering detector modules further comprises: a hardenite for decreasing the intensity of the pair production effect annihilation photons and the Compton-effect scattering photons from the one sub-region corresponding to the collimator of the scattering detector module.

In another exemplary embodiment according to the present invention, the detector is located in a collimation slit of the collimator; the shield is disposed at one side of the collimator opposite to the article, and seals an opening of the collimation slit at the one side; and the hardenite is disposed at the other side of the collimator facing the article, and seals the other opening of the collimation slit at the other side.

In another exemplary embodiment according to the present invention, the shield and the collimator are formed into a piece.

In another exemplary embodiment according to the present invention, the x-ray machine is a monoenergetic x-ray machine or a polyenergetic x-ray machine.

In another exemplary embodiment according to the present invention, the x-rays generated by the x-ray machine have energy of more than 1.022 MeV.

According to another aspect of the present invention, there is provided an article inspection method, comprising:

detecting an attenuation information of x-rays transmitting through an article by use of a transmission detector array, and detecting pair production effect annihilation photon count and Compton-effect scattering photon count during the x-rays transmits through the article by use of at least one scattering detector array; and forming a two-dimensional image of the article based on the detected attenuation information, and forming a three-dimensional image of the article based on a ratio of the pair production effect annihilation photon count to the Compton-effect scattering photon count.

BRIEF DESCRIPTION OF THE DRAWINGS

These and/or other aspects and advantages of the invention will become apparent and more readily appreciated from the following description of the embodiments, taken in conjunction with the accompanying drawings, in which.

DETAILED DESCRIPTION OF PREFERRED EMBODIMENTS OF THE INVENTION

Figure 1:
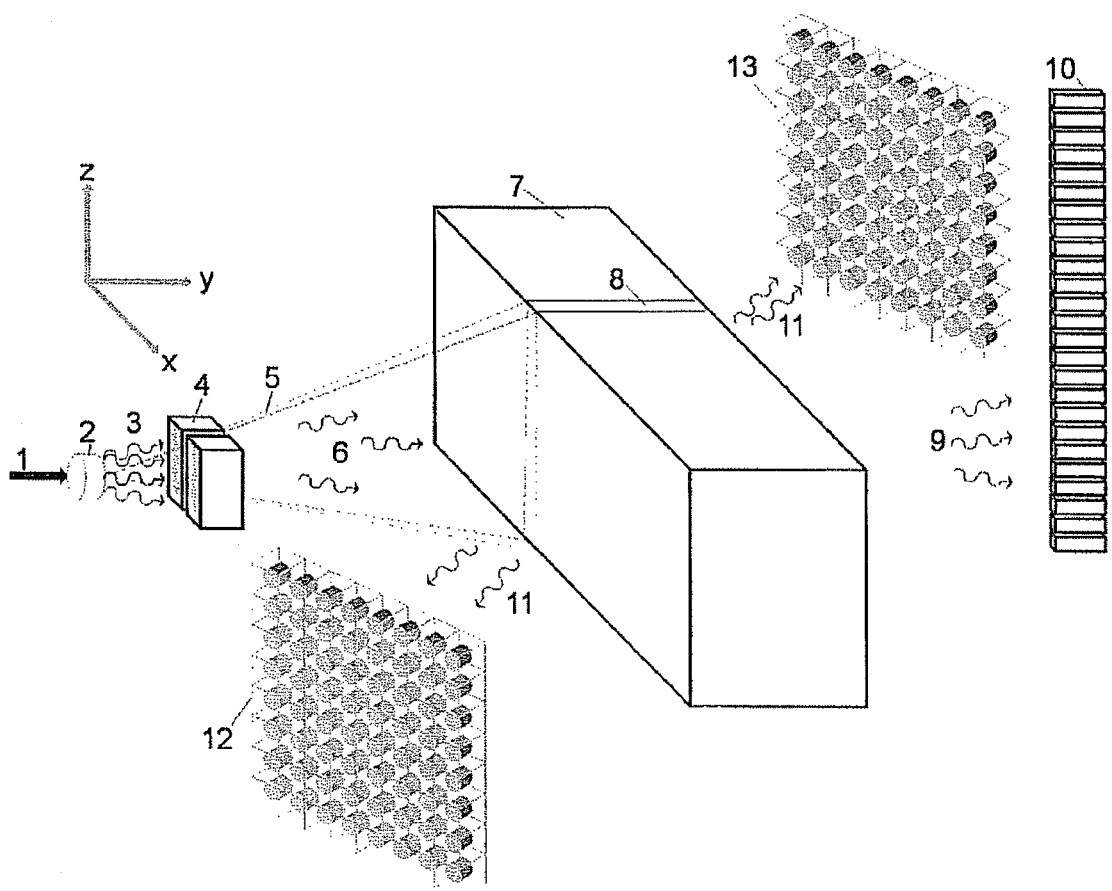
FIG. 1 is a schematic view of an article inspection device according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

FIG. 1 is a schematic view of an article inspection device according to an embodiment of the present invention.

As shown in FIG. 1, in an exemplary embodiment of the present invention, the article inspection device mainly comprises: an x-ray machine, a collimation unit 4, a transmission detector array 10 and two scattering detector arrays 12, 13.

In this exemplary embodiment, referring to FIG. 1, the x-ray machine generates x-rays 3 by applying an electron beam 1 to bombard an electron target 2. The collimation unit 4 forms or shapes the x-rays 3 generated by the x-ray machine into a sector beam 5, and projects x-rays 6 of the sector beam 5 to an article 7. The sector beam 5 will transmit through the article 7 along a transmission cross section 8.

Also referring to FIG. 1, the transmission detector array 10 is provided at an opposite side to the x-ray machine for detecting the x-rays 9 transmitting through the article 7 so as to form a two-dimensional image of the article 7. The two scattering detector arrays 12, 13 are provided at both sides of the article 7 for detecting scattering photons 11 from the article 7 so as to form a three-dimensional image of the article 7.

In an exemplary embodiment of the present invention, the x-ray machine, the collimation unit 4 and the transmission detector array 10 each may be a conventional one that has been applied in a traditional x-ray imaging device. For clarity, herein is omitted their further detailed description.

In an exemplary embodiment of the present invention, the electron beam 1 of the x-ray machine should have enough energy to excite the electron target 2 after the electron target 2 is bombarded by the electron beam 1 to generate the x-rays 3 having energy enough to produce an electron pair effect, for example, the electron beam 1 of the x-ray machine may have energy of more than 1.022 MeV. In an exemplary embodiment of the present invention, the electron target 2 may be a composite target composed of wolfram and gold, or may be any one of conventional targets that can be adapted to the present invention.

As shown in FIG. 1, during x-rays 6 of the sector beam 5 transmit through the transmission cross section 8 of the article 7, the x-rays 6 of the sector beam 5 are attenuated because the photoelectric effect, the Compton effect, the pair production effect and the Rayleigh scattering effect occur:

In an exemplary embodiment of the present invention, refer to FIG. 1, the first scattering detector array 12 is provided at the same side of the article 7 as the x-ray machine, and the second scattering detector array 13 is provided at an opposite side of the article 7 to the first scattering detector array 12.

Figure 2:
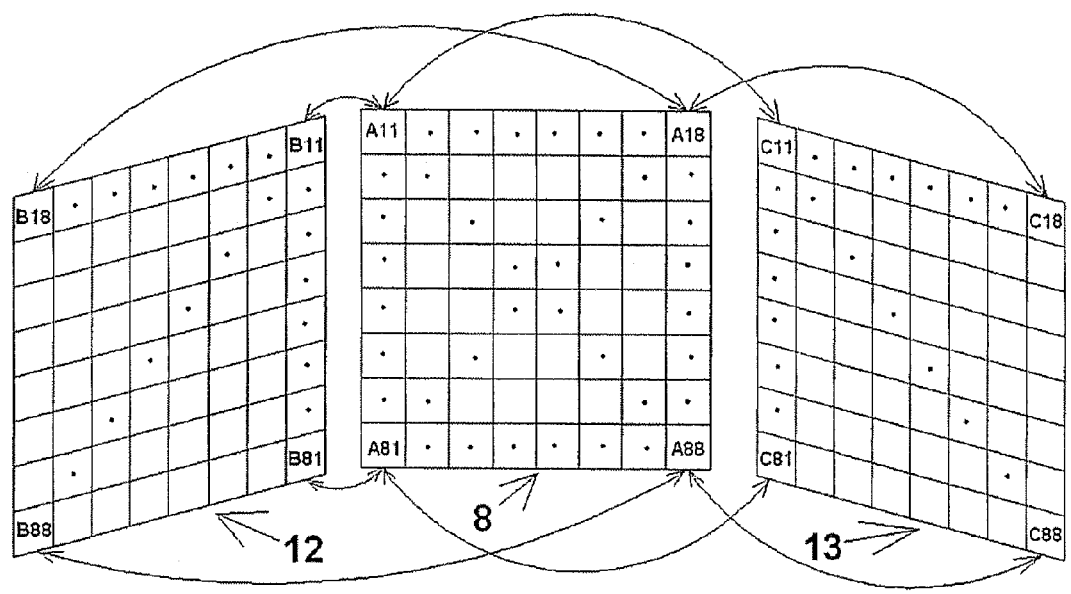
FIG. 2 is a view showing a corresponding relation between each of sub-regions of a transmission cross section of the article to be inspected and each of first scattering detector modules and each of second scattering detector modules.

Although it is not shown, in the present invention, please be noted that there may be one scattering detector array, three scattering detector arrays or more, FIG. 2 shows a corresponding relation between each of sub-regions of a transmission cross section of the article and each of first scattering detector modules and each of second scattering detector modules.

Please refer to FIG. 1 and FIG. 2, in an exemplary embodiment of the present invention, the first scattering detector array 12 comprises sixty-four first scattering detector modules arranged in a matrix of 8-rows and 8-columns, and all the first scattering detector modules are exactly the same as one another. As shown in FIG. 2, the sixty-four first scattering detector modules arranged in the matrix of 8-rows and 8-columns comprises:

Eight first scattering detector modules B11-B18 in a first line of the first scattering detector array 12;

Eight first scattering detector modules B21-B28 in a second line of the first scattering detector array 12;

Eight first scattering detector modules B31-B38 in a third line of the first scattering detector array 12;

Eight first scattering detector modules B41-B48 in a fourth line of the first scattering detector array 12;

Eight first scattering detector modules B51-B58 in a fifth line of the first scattering detector array 12;

Eight first scattering detector modules B61-B68 in a sixth line of the first scattering detector array 12;

Eight first scattering detector modules B71-B78 in a seventh line of the first scattering detector array 12; and Eight first scattering detector modules B81-B88 in an eighth line of the first scattering detector array 12.

Similarly, please refer to FIG. 1 and FIG. 2, in an exemplary embodiment of the present invention, the second scattering detector array 13 comprises sixty-four second scattering detector modules arranged in a matrix of 8-rows and 8-columns, and all the second scattering detector modules are exactly the same as one another. As shown in FIG. 2, the sixty-four second scattering detector modules arranged in the matrix of 8-rows and 8-columns comprises:

Eight second scattering detector modules C11-C18 in a first line of the second scattering detector array 13;

Eight second scattering detector modules C21-C28 in a second line of the second scattering detector array 13;

Eight second scattering detector modules C31-C38 in a third line of the second scattering detector array 13;

Eight second scattering detector modules C41-C48 in a fourth line of the second scattering detector array 13;

Eight second scattering detector modules C51-C58 in a fifth line of the second scattering detector array 13;

Eight second scattering detector modules C61-C68 in a sixth line of the second scattering detector array 13;

Eight second scattering detector modules C71-C78 in a seventh line of the second scattering detector array 13; and Eight second scattering detector modules C81-C88 in an eighth line of the second scattering detector array 13.

Similarly, please continue refer to FIG. 1 and FIG. 2, the transmission cross section 8 of the article 7 is divided into sixty-four sub-regions arranged in a matrix of 8-rows and 8-columns, and all the sub-regions are exactly the same as one another. As shown in FIG. 2, the sixty-four sub-regions arranged in the matrix of 8-rows and 8-columns comprises:

Eight sub-regions A11-A18 in a first line of the transmission cross section 8;

Eight sub-regions A21-A28 in a second line of the transmission cross section 8;

Eight sub-regions A31-A38 in a third line of the transmission cross section 8;

Eight sub-regions A41-A48 in a fourth line of the transmission cross section 8;

Eight sub-regions A51-A58 in a fifth line of the transmission cross section 8;

Eight sub-regions A61-A68 in a sixth line of the transmission cross section 8;

Eight sub-regions A71-A78 in a seventh line of the transmission cross section 8; and Eight sub-regions A81-A88 in an eighth line of the transmission cross section 8.

As shown in FIG. 2, in an exemplary embodiment of the present invention, each of the sub-regions of the transmission cross section 8 corresponds to each of the first scattering detector modules of the first scattering detector array 12, and each of the sub-regions of the transmission cross section 8 corresponds to each of the second scattering detector modules of the second scattering detector array 13. For example, the sub-region A11 respectively corresponds to the first scattering detector module B11 and the second scattering detector module C11; the sub-region A81 respectively corresponds to the first scattering detector module B81 and the second scattering detector module C81; the sub-region A88 respectively corresponds to the first scattering detector module B88 and the second scattering detector module C88. Thereby, in the exemplary embodiment of the present invention, each of the scattering detector modules only can detect scattering photons from the corresponding one sub-region of the transmission cross section.

Although it is not shown, in an exemplary embodiment of the present invention, the first scattering detector array 12 or the second scattering detector array 13 each may comprises a plurality of same scattering detector modules arranged in a matrix of i-rows and j-columns, such as four same scattering detector modules arranged in a matrix of 2-rows and 2-columns, six same scattering detector modules arranged in a matrix of 2-rows and 3-columns, six same scattering detector modules arranged in a matrix of 3-rows and 2-columns, nine same scattering detector modules arranged in a matrix of 3-rows and 3-columns, twelve same scattering detector modules arranged in a matrix of 3-rows and 4-columns, and so on. That is, in the exemplary embodiment of the present invention, 'i' may be a positive integer equal to or greater than 2, and 'j' may be a positive integer equal to or greater than 2. Similarly, the transmission cross section 8 may be divided into a plurality of same sub-regions arranged in a matrix of i-rows and j-columns.

In the exemplary embodiment of the present invention, the resolution of the three-dimensional image formed by the article inspection device is proportional to parameters 'i' and 'j'. That is, when the parameters 'i' and 'j' become larger, the resolution of the three-dimensional image becomes higher. But the parameters 'i' and 'j' can not be too large, otherwise it makes the cost of the article inspection device very high.

Figure 3:
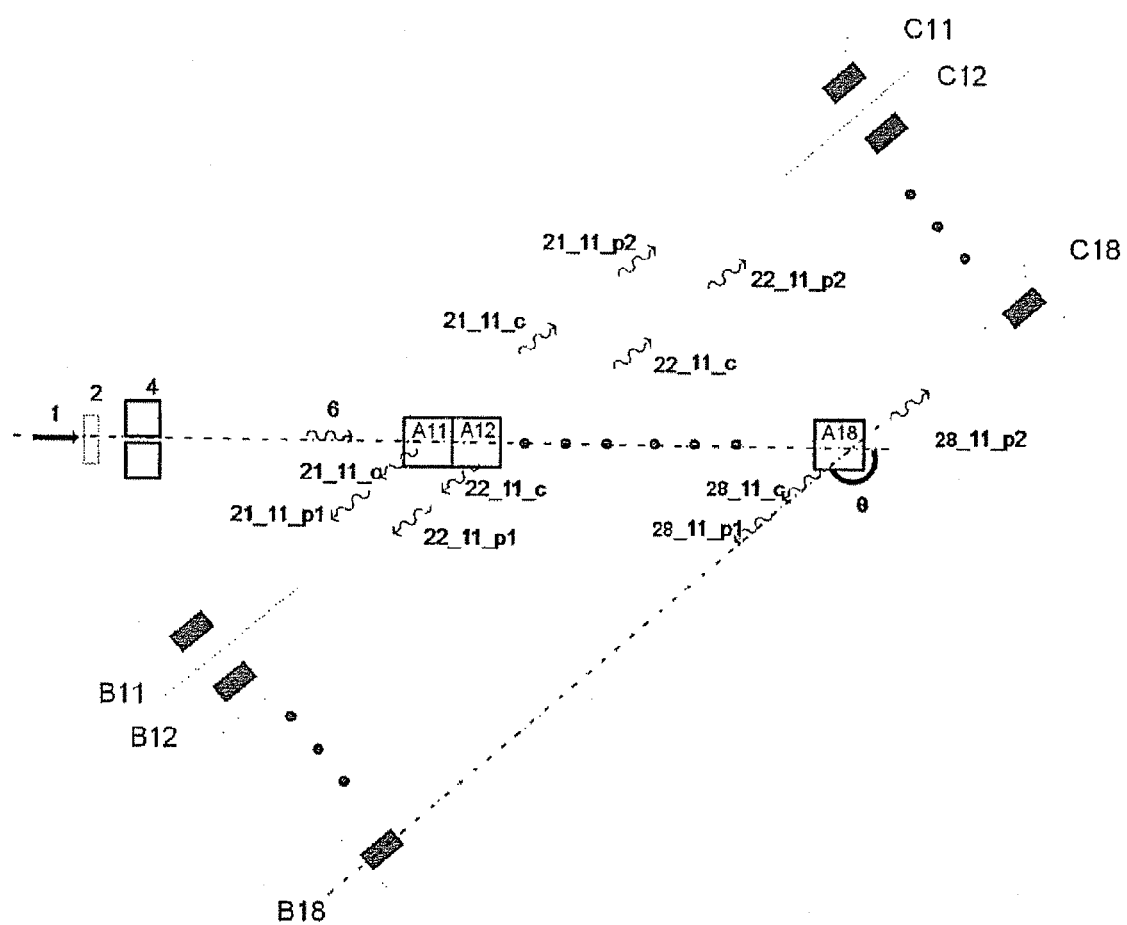
FIG. 3 is a cross section view along a plane perpendicular to Z-axis shown in FIG. 1.

FIG. 3 is a cross section view along a plane perpendicular to Z-axis shown in FIG. 1. Next the procedure of detecting scattering photons generated at respective sub-regions by using respective scattering detector modules will be described with respect to FIG. 3.

As above description, during the x-rays 6 of the sector beam 5 transmit through the transmission cross section 8 of the article 7, the photoelectric effect, the Compton Effect, the pair production effect and the Rayleigh scattering effect occur. The four effects will be simply described as follows.

1) Photoelectric Effect

In the photoelectric effect, photons are absorbed and their energy is converted into the energy of photoelectrons and characteristic x-rays. Generally, the photoelectrons can not be detected by the scattering detector modules, and the characteristic x-rays do not have enough energy to pass through the article and thus can not be detected by the scattering detector modules. But because of bremsstrahlung effect, the photoelectrons may be converted into x-rays having high energy and thus can be detected by the scattering detector modules. However, the present invention takes no interest in x-rays entering the scattering detector modules at all.

2) Compton Effect

As shown in FIG. 3, when incident x-rays 6 react with respective sub-regions of the transmission cross section 8 of the article 7, the Compton Effect may occur.

Please refer to FIG. 3, when the incident x-rays 6 react with the sub-region A11, some Compton-effect scattering photons 21_11_P1 may enter a scattering detector of a first scattering detector module B11. In an exemplary embodiment of the present invention, the first scattering detector module B11 is designed and arranged so that only the Compton-effect scattering photons 21_11_P1 from a sub-region A11 corresponding to the first scattering detector module B11 can enter the first scattering detector module B11. Similarly, any one of the other first scattering detector modules B12-B18 is also designed and arranged to only receive the Compton-effect scattering photons from one sub-region corresponding to it. For example, as shown in FIG. 3, the first scattering detector module B12 can only receive the Compton-effect scattering photons 22_11_P1 from the sub-region A12 . . . , the first scattering detector module B18 can only receive the Compton-effect scattering photons 28_11_P1 from the sub-region A18.

Similarly, please refer to FIG. 3, when the incident x-rays 6 react with the sub-region A11, some Compton-effect scattering photons 21_11_P2 may enter a scattering detector of a second scattering detector module C11 corresponding to the same sub-region A11. In an exemplary embodiment of the present invention, the second scattering detector module C11 is designed and arranged so that only the Compton-effect scattering photons 21_11_P2 from the sub-region A11 corresponding to the second scattering detector module C11 can enter the second scattering detector module C11. Similarly, any one of the other second scattering detector modules C12-C18 is also designed and arranged to only receive the Compton-effect scattering photons from one sub-region corresponding to it. For example, as shown in FIG. 3, the second scattering detector module C12 can only receive the Compton-effect scattering photons 22_11_P2 from the sub-region A12 . . . , the second scattering detector module C18 can only receive the Compton-effect scattering photons 28_11_P2 from the sub-region A18.

It is well known that the Compton scattering cross section is proportional to the atomic number when the energy of incident x-rays 6 is constant. Therefore, in case respective sub-regions of the article have a same atomic density, the larger is the atomic number of one sub-region of the article, the larger is the Compton-effect scattering photon count detected by a scattering detector module corresponding to the one sub-region.

3) Pair Production Effect

As shown in FIG. 3, when the incident x-rays 6 react with respective sub-regions of the transmission cross section 8 of the article 7, the electron pair effect may occur. In the electron pair effect, because flight in a solid of positron produced by the electron pair effect is in the order of millimeter, each positron is annihilated and finally becomes two gamma photons each having energy of 511 KeV, the position where the two gamma photons are produced is in the sub-region A11.

Please refer to FIG. 3, in an exemplary embodiment of the present invention, the first scattering detector module B11 is designed and arranged so that only the pair production effect annihilation photons 21_11_C from a sub-region A11 corresponding to the first scattering detector module B11 can enter into the first scattering detector module B11. Similarly, any one of other first scattering detector modules B12-B18 is also designed and arranged to only receive the pair production effect annihilation photons from one sub-region corresponding to it. For example, as shown in FIG. 3, the first scattering detector module B12 can only receive the pair production effect annihilation photons 22_11_C from the sub-region A12 . . . , the first scattering detector module B18 can only receive the pair production effect annihilation photons 28_11_C from the sub-region A18.

Similarly, please refer to FIG. 3, in an exemplary embodiment of the present invention, the second scattering detector module C11 is designed and arranged so that only the pair production effect annihilation photons 21_11_C from the sub-region A11 corresponding to the second scattering detector module C11 can enter the second scattering detector module C11. Similarly, any one of other second scattering detector modules C12-C18 is also designed and arranged to only receive the pair production effect annihilation photons from one sub-region corresponding to it. For example, as shown in FIG. 3, the second scattering detector module C12 can only receive the pair production effect annihilation photons 22_11_C from the sub-region A12 . . . , the second scattering detector module C18 can only receive the pair production effect annihilation photons 28_11_C from the sub-region A18.

It is well known that the pair production effect cross section is proportional to the second power of the atomic number. Therefore, in case respective sub-regions of the article have a same atomic density, the larger is the atomic number of one sub-region of the article, the larger is the pair production effect annihilation photon count detected by a scattering detector module corresponding to the one sub-region.

4) Rayleigh Scattering Effect

When the incident x-rays 6 have energy of more than 1.022 MeV, the Rayleigh scattering effect can be omitted because Rayleigh scattering cross section is very small.

As for the above four scattering effects, the first and second scattering detector arrays 12, 13 both take interest in only the Compton scattering effect and the pair production effect. As the above description, the Compton-effect scattering photon count and the pair production effect annihilation photon count are proportional to the first power and the second power of the atomic number, respectively. Therefore, the ratio of the pair production effect annihilation photon count detected by the scattering detector arrays 12, 13 to the Compton-effect scattering photon count detected by the scattering detector arrays 12, 13 is proportional to the first power of the atomic number. Accordingly, the atomic number information of respective sub-regions of the article can be obtained by the ratio of the pair production effect annihilation photon count to the Compton-effect scattering photon count.

Figure 4:
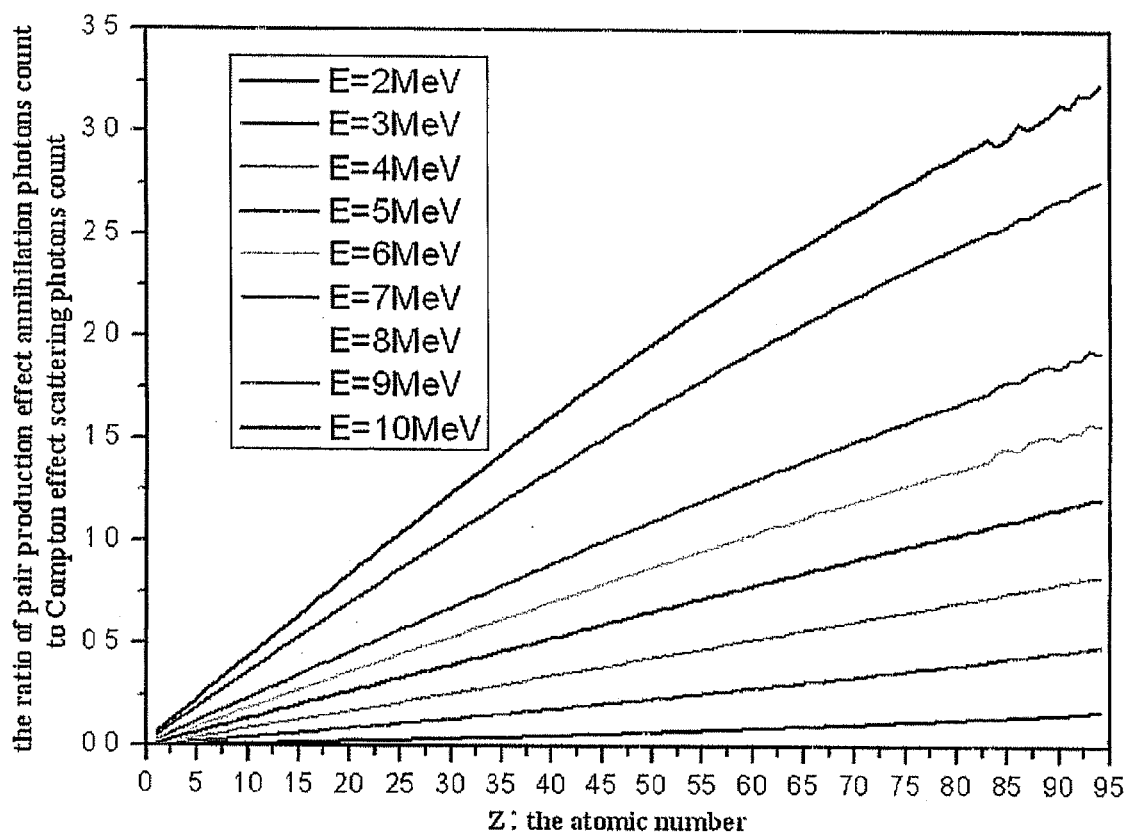
FIG. 4 shows a relation between an atomic number and a ratio of the pair production effect annihilation photon count to the Compton-effect scattering photon count.

FIG. 4 shows a relation between the ratio of the pair production effect annihilation photon count to the Compton-effect scattering photon count and the atomic number when incident x-rays 6 have different energies.

Referring to FIG. 4, there is an excellent linear relationship between the atomic number and the ratio of the pair production effect annihilation photon count to the Compton-effect scattering photon count. Therefore, the atomic number can be calculated by a following formula:

$$Z_{pc} = \frac{C_{-pair}}{C_{-compton}} \propto Z$$

wherein, $C_{-path}$ is the pair production effect annihilation photon count;

$C_{-compton}$ is the Compton-effect scattering photon count;

$Z_{pc}$ is the ratio of the pair production effect annihilation photon count to the Compton-effect scattering photon count;

Z is the atomic number.

In practice, because of some unavoidable errors, it needs to calibrate the relation between the ratio Zpc and the atomic number Z according to experiments.

As the above description, the transmission cross section 8 of the article 7 is divided into a plurality of same sub-regions arranged in a matrix of i-rows and j-columns, and the first and second scattering detector arrays 12, 13 each correspondingly comprises a plurality of same scattering detector modules arranged in a matrix of i-rows and j-columns. Thereby, the atomic numbers at the sub-regions, arranged in a matrix of i-rows and j-columns, of the transmission cross section 8 can be obtained by the detection information from the scattering detector modules, arranged in a matrix of i-rows and j-columns, of the scattering detector arrays 12, 13. When the article is wholly scanned, the atomic numbers at every sub-region of every transmission cross section 8 of the article can be obtained, and then a three-dimensional image of the whole article can be formed according to the atomic numbers at every sub-region of the article.

Figure 5:
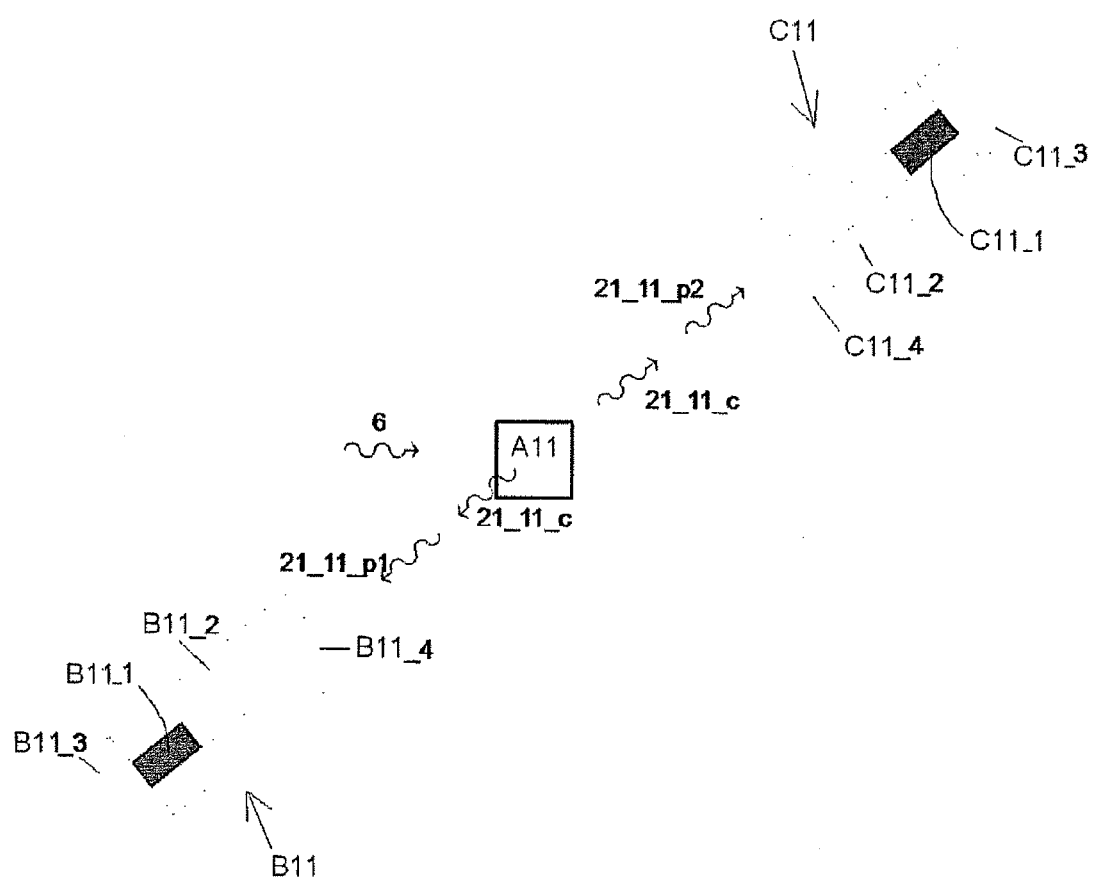
FIG. 5 is a schematic structure view of each of scattering detector modules of the first and second scattering detector arrays.

FIG. 5 is a schematic structure view of a pair of scattering detector modules of the first and second scattering detector arrays corresponding to one sub-region. A pair of detector modules corresponding to the same sub-region can be regarded as one detector unit, thus, first and second scattering detector arrays 12, 13 form 64 detector units.

In an exemplary embodiment of the present invention, each of the first scattering detector modules of the first scattering detector array 12 is exactly the same as each of the second scattering detector modules of the second scattering detector array 13. Here will only describe the first scattering detector module B11 and the second scattering detector module C11 both corresponding to the sub-region A11, as shown in FIG. 5.

Please refer to FIG. 5, the first scattering detector module B11 comprises a first detector B11_1 and a first collimator B11_2. In the illustrated exemplary embodiment, the first collimator B11_2 is configured to permit only the pair production effect annihilation photons 21_11_C and the Compton effect scattered photons 21_11_P1 from the sub-region A11 corresponding to the first collimator B11_2 to enter the first detector B11_1, that is, the first collimator B11_2 is configured to substantially absorb the pair production effect annihilation photons and the Compton effect scattered photons from other sub-regions not corresponding to the first collimator B11_2.

Similarly, also referring to FIG. 5, the second scattering detector module C11 comprises a second detector C11_1 and a second collimator C11_2. In the illustrated exemplary embodiment, the second collimator C11_2 is configured to permit only the pair production effect annihilation photons 21_11_C and the Compton effect scattered photons 21_11_P2 from the sub-region A11 corresponding to the second collimator C11_2 to enter the second detector C11_1, that is, the second collimator C11_2 is configured to substantially absorb the pair production effect annihilation photons and the Compton effect scattered photons from other sub-regions not corresponding to the second collimator C11_2.

In an exemplary embodiment of the present invention, the first detector B11_1 or the second detector C11_1 may be a type of detector with a high energy resolution and a quick time response characteristic.

In an exemplary embodiment of the present invention, the first detector B11_1 or the second detector C11_1 may be a plastic scintillator detector or a liquid scintillator detector. The plastic scintillator detector and the liquid scintillator detector both have a quick time response characteristic and can detect the gamma photons within nanoseconds.

In an exemplary embodiment of the present invention, the first detector B11_1 or the second detector C11_1 may be a $LaBr_3(Ce)$ detector or a $LaCl_3(Ce)$ detector. The $LaBr_3(Ce)$ detector and the $LaCl_3(Ce)$ detector both have a high energy resolution and a quick time response characteristic.

In an exemplary embodiment of the present invention, the first detector B11_1 or the second detector C11_1 may be an HPGe detector. The HPGe detector has an excellent energy resolution, but has a poor time response characteristic.

In an exemplary embodiment of the present invention, the first detector B11_1 or the second detector C11_1 may be a CdZnTe detector. The CdZnTe detector also has an excellent energy resolution, but has a poor time response characteristic and its price is very high.

In an exemplary embodiment of the present invention, the first collimator B11_2 or the second collimator C11_2 may be made of lead, steel or copper. In this way, the first collimator B11_2 or the second collimator C11_2 may effectively absorb the pair production effect annihilation photons and the Compton effect scattered photons from other sub-regions not corresponding to it, and permits only the pair production effect annihilation photons and the Compton effect scattered photons from the sub-region A11 corresponding to it to enter its detector.

In an exemplary embodiment of the present invention, as shown in FIG. 5, the first scattering detector module B11 further comprises a first shield B11_3 for preventing the pair production effect annihilation photons 21_11_C and the Compton effect scattered photons 21_11_P1 from sub-regions not corresponding to the first scattering detector module B11 from entering the first detector B11_1, and particularly, preventing various transmitting or scattering x-rays from the electron target 2 from entering the first detector B11_1. In an exemplary embodiment of the present invention, the first shield B11_3 may be made of lead, steel or copper, or other suitable material.

Similarly, in an exemplary embodiment of the present invention, as shown in FIG. 5, the second scattering detector module C11 further comprises a second shield C11_3 for preventing the pair production effect annihilation photons 21_11_C and the Compton effect scattered photons 21_11_P2 from sub-regions not corresponding to the second scattering detector module C11 from entering the second detector C11_1, and particularly, preventing various transmitting or scattering x-rays from the electron target 2 from entering the second detector C11_1. In an exemplary embodiment of the present invention, the second shield C11_3 may be made of lead, steel or copper, or other suitable material.

In an exemplary embodiment of the present invention, as shown in FIG. 5, the first scattering detector module B11 further comprises a first hardenite B11_4 for decreasing the intensity of the pair production effect annihilation photons 21_11_C and the Compton effect scattered photons 21_11_P1 from the sub-region A11 corresponding to the first scattering detector module B11 so as to decrease the intensity of the pair production effect annihilation photons 21_11_C and the Compton effect scattered photons 21_11_P1 entering the first detector B11_1. Otherwise, the first detector B11_1 may be in an abnormal operation state because the counting rate is too high. In an exemplary embodiment of the present invention, the first hardenite B11_4 may be made of lead, steel or copper, or other suitable material.

Similarly, in an exemplary embodiment of the present invention, as shown in FIG. 5, the second scattering detector module C11 further comprises a second hardenite C11_4 for decreasing the intensity of the pair production effect annihilation photons 21_11_C and the Compton effect scattered photons 21_11_P2 from the sub-region A11 corresponding to the second scattering detector module C11 so as to decrease the intensity of the pair production effect annihilation photons 21_11_C and the Compton effect scattered photons 21_11_P2 entering the second detector C11_1. Otherwise, the second detector C11_1 may be in an abnormal operation state because the counting rate is too high. In an exemplary embodiment of the present invention, the second hardenite C11_4 may be made of lead, steel or copper, or other suitable material.

Also referring to FIG. 5, in an exemplary embodiment of the present invention, the first detector B11_1 is located in a collimation slit of the first collimator B11_2. The first shield B11_3 is disposed at one side of the first collimator B11_2 opposite to the first hardenite B11_4 and seals an opening of the collimation slit at the one side. The first hardenite B11_4 is disposed at the other side of the first collimator B11_2, and seals the other opening of the collimation slit at the other side.

Similarly, please continue refer to FIG. 5, in an exemplary embodiment of the present invention, the second detector C11_1 is located in a collimation slit of the second collimator C11_2. The second shield C11_3 is disposed at one side of the second collimator C11_2 opposite to the second hardenite C11_4 and seals an opening of the collimation slit at the one side. The second hardenite C11_4 is disposed at the other side of the second collimator C11_2, and seals the other opening of the collimation slit at the other side.

In an exemplary embodiment of the present invention, the first shield B11_3 and the first collimator B11_2 are formed into a piece. But please be noted that the first shield B11_3 and the first collimator B11_2 may be formed into two individual pieces. Similarly, in an exemplary embodiment of the present invention, the second shield C11_3 and the second collimator C11_2 are formed into a piece. But please be noted that the second shield C11_3 and the second collimator C11_2 may be formed into two individual pieces, FIG. 6 shows energy spectrums of the pair production effect annihilation photons and the Compton effect scattered photons entering the first and second scattering detector arrays.

Figure 6:
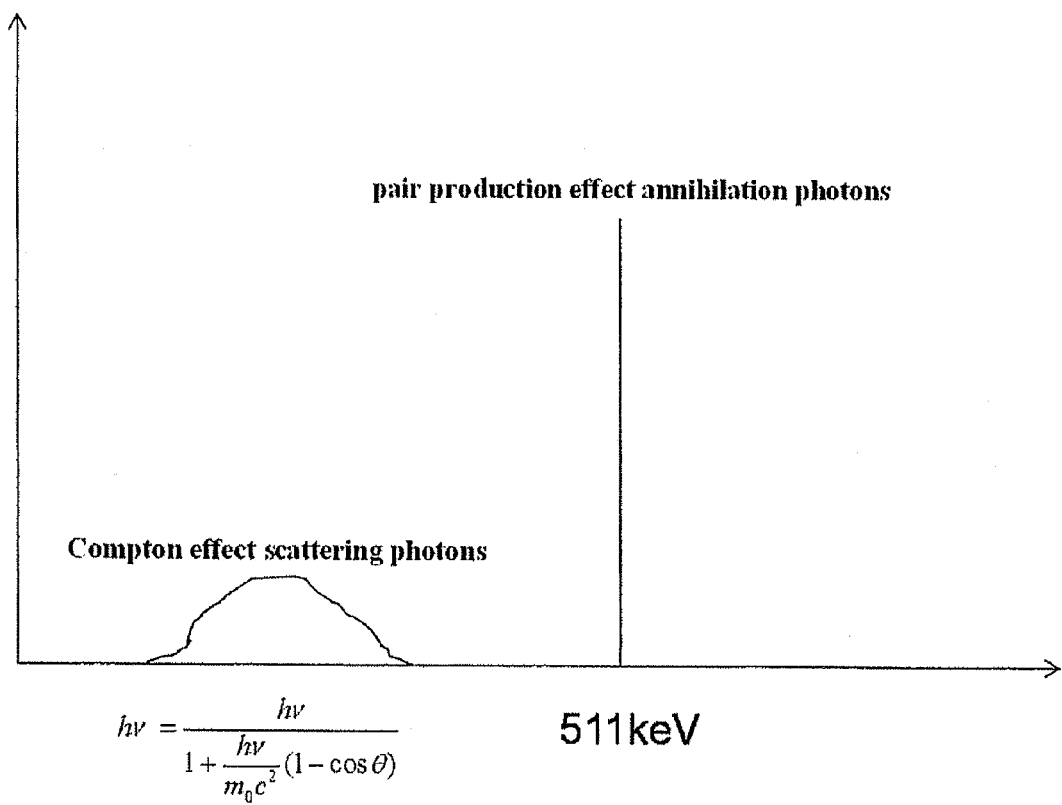
FIG. 6 shows energy spectrums of the pair production effect annihilation photons and the Compton-effect scattering photons entering the first and second scattering detector arrays.

As shown in FIG. 6, the pair production effect annihilation photons have energy of 511 KeV.

As a formula shown in FIG. 6, the energy of the Compton-effect scattering photons is mainly related to two parameters: Compton scattering angle θ (please see FIG. 3) and the energy hv of the incident x-rays 6. Because the energy spectrum of the incident x-rays 6 is a continuous energy spectrum, the energy spectrum of the Compton-effect scattering photons is also a continuous energy spectrum, as shown in FIG. 6.

In the above-mentioned several types of detectors, the plastic scintillator detector and the liquid scintillator detector are preferred, because they have the quickest time response characteristic and can detect the gamma photons within nanoseconds. And other types of detectors can not detect signals within nanoseconds, for example, when an impulse width of the x-ray machine is about 5 μs, the HPGe detector can only detect one signal within the impulse width, the $LaBr_3(Ce)$ detector or the $LaCl_3(Ce)$ detector can only detect less than ten signals within the impulse width, and the CdZnTe detector also can only detect several signals within the impulse width.

In order to detect more photons within the impulse width of the x-ray machine, the plastic scintillator detector and the liquid scintillator detector are preferred. But the plastic scintillator detector and the liquid scintillator detector have a low energy resolution. Therefore, it is difficult for plastic scintillator detector and the liquid scintillator detector to discriminate the annihilation photons of 511 KeV from Compton-effect scattering photons through the energy spectrums. Please be noted that the other types of detectors also have the similar problem as the plastic scintillator detector and the liquid scintillator detector. Accordingly, an exemplary embodiment of the present invention, there is provided a coincidence counting method and system to effectively discriminate the Compton-effect scattering photons from the pair production effect annihilation photons.

Figure 7:
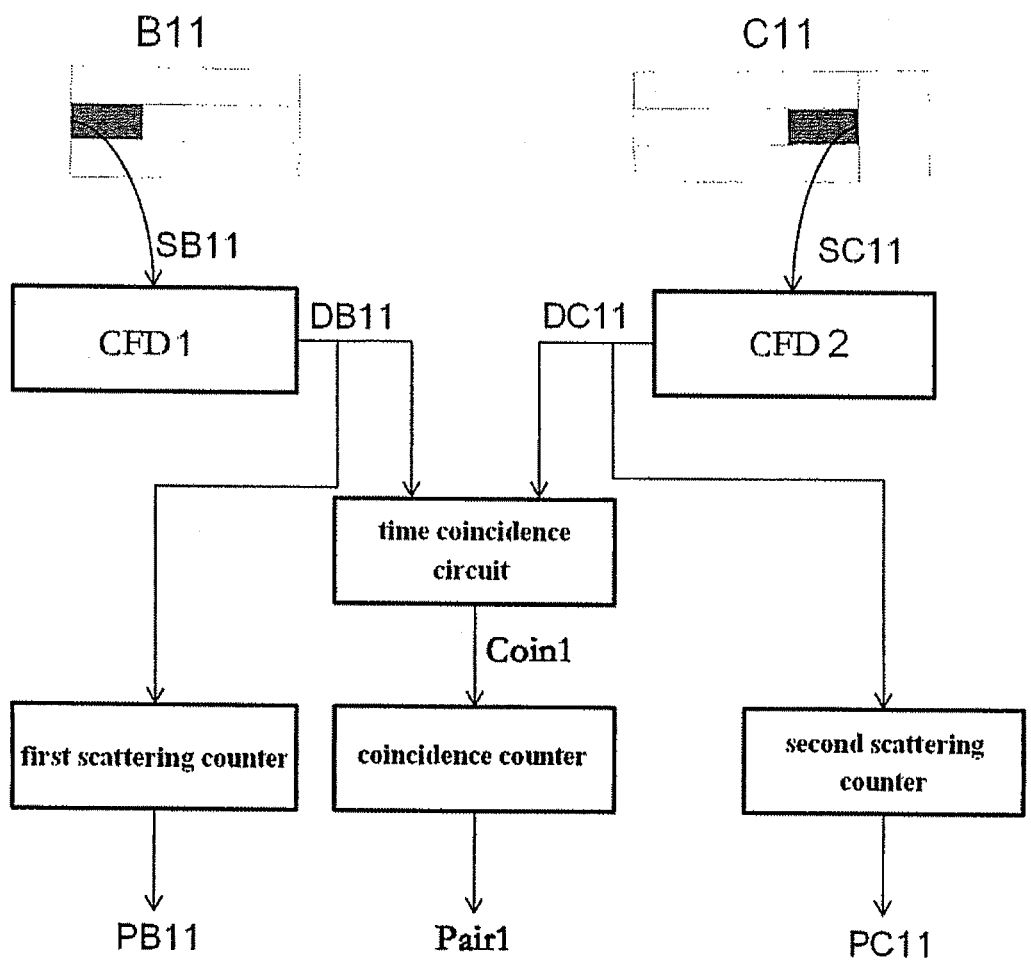
FIG. 7 shows a schematic block diagram of a coincidence counting system.

FIG. 7 shows a schematic block diagram of a coincidence counting system. The coincidence counting system of FIG. 7 corresponds to and is used for the sub-region A11 (please see FIG. 3).

Firstly, as shown in FIG. 7, after detecting the photons from the sub-region A11 (please see FIG. 5), the first scattering detector module B11 outputs a first analog signal SB11 to a first constant fraction discriminator CFD1. Similarly, after detecting the photons from the sub-region A11 (please see FIG. 5), the second scattering detector module C11 outputs a second analog signal SC11 to a second constant fraction discriminator CFD2.

Secondly, as shown in FIG. 7, after the first analog signal SB11 is input to the first constant fraction discriminator CFD1, the first constant fraction discriminator CFD1 converts the first analog signal SB11 into a first time signal DB11. Similarly, after the second analog signal SC11 is input to the second constant fraction discriminator CFD2, the second constant fraction discriminator CFD2 converts the second analog signal SC11 into a second time signal DC11.

By means of the first constant fraction discriminator, the first time signal DB11 can accurately denote the time when the first analog signal SB11 is formed, and by means of the second constant fraction discriminator, the second time signal DC11 can accurately denote the time when the second analog signal SC11 is formed.

The first constant fraction discriminator CFD1 or the second constant fraction discriminator CFD2 may be a conventional constant fraction discriminator that is well known for those skilled in this art. The constant fraction discriminator can accurately get time information from the analog signal SB11 or SC11. But the present invention is not limited to this, in an exemplary embodiment of the present invention, the constant fraction discriminator may be replaced by a traditional threshold discriminator that also can get the time signals DB11, DC11.

Thirdly, as shown in FIG. 7, the first time signal DB11 and the second time signal DC11 both are input to a time coincidence circuit corresponding to the sub-region A11, the time coincidence circuit determines whether the first time signal DB11 and the second time signal DC11 are 'almost simultaneously' input to it. Herein the term 'almost simultaneously' means that a time difference between the time when the first scattering detector module B11 receives the photons and the time when the second scattering detector module C11 receives the photons is within a predetermined range.

When the first time signal DB11 and the second time signal DC11 are 'almost simultaneously' input to the time coincidence circuit, the time coincidence circuit outputs a time coincidence signal Coin1 to the coincidence counter, and the coincidence counter is added by '1', and it means that two pair production effect annihilation photons of 511 KeV are detected. The accumulative value Pair 1 of the coincidence counter over a predetermined time period denotes the pair production effect annihilation photon count.

Further, the first time signal DB11 is individually input to a first scattering counter. Once the first scattering counter receives one first time signal DB11, the first scattering counter is added by '1'. Over a predetermined time period, the first scattering counter can get an accumulative value PB11 denoting the first scattering counter count. Please be noted that the first scattering counter count PB11 includes the pair production effect annihilation photon count Pair1 and the Compton scattering photon count.

Further, the second time signal DC11 is individually input to a second scattering counter. Once the second scattering counter receives one second time signal DC11, the second scattering counter is added by '1'. Over a predetermined time period, the second scattering counter can get an accumulative value PC11 denoting the second scattering counter count. Please be noted that the second scattering counter count PC11 includes the pair production effect annihilation photon count Pair1 and the Compton scattering photon count.

Figure 8:
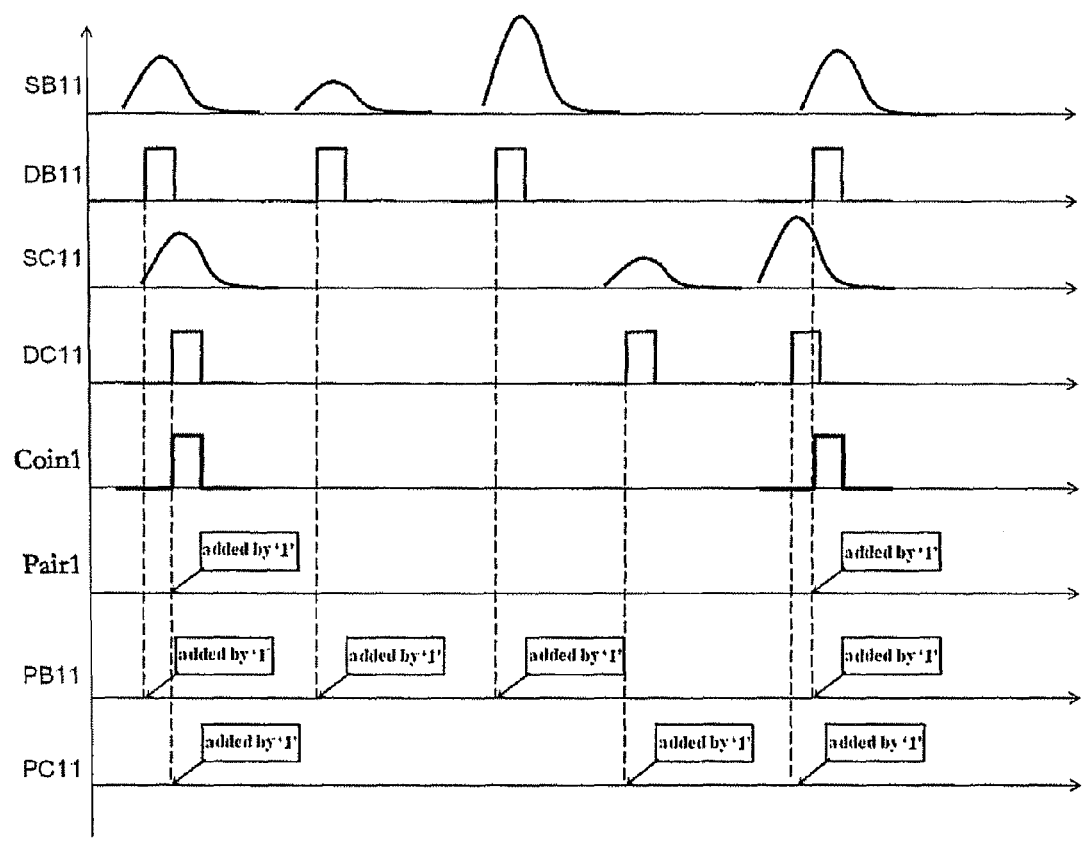
FIG. 8 shows sequential charts of various signals and parameters shown in FIG. 7.

FIG. 8 shows sequential charts of various signals and parameters shown in FIG. 7. As shown in FIG. 8, the pair production effect annihilation photon count Pair1 is added by '1' once the input of the first time signal DB11 and the input of the second time signal DC11 'almost simultaneously' occur, the first scattering counter count PB11 is added by '1' once the input of the first time signal DB11 occurs, and the second scattering counter count PC11 is added by '1' once the input of the second time signal DC11 occurs. Obviously, the value Pair1 is less than the value PB11 or the value PC11.

Herein, the relation between the pair production effect annihilation photon count and the Compton-effect scattering photon count can be obtained by the value Paid and the value PB11. Similarly, the relation between the pair production effect annihilation photon count and the Compton-effect scattering photon count also can be obtained by the value Pair1 and the value PC11.

In practice, a detection efficiency of a scattering detector module for the Compton-effect scattering photons is related to many factors, such as position, scattering angle, and so on. Therefore, in FIG. 7 and FIG. 8, the detection efficiency of the first scattering detector module B11 for the Compton-effect scattering photons is different from the detection efficiency of the second scattering detector module C11 for the Compton-effect scattering photons.

In an exemplary embodiment of the present invention, an average detection efficiency of the first and second scattering detector modules B11 and C11 can be got through experiments. Herein, the average detection efficiency of the first and second scattering detector modules B11 and C11 are defined as $\epsilon\_b$ and $\epsilon\_c$, respectively. The detection efficiency of the first and second scattering detector modules for the pair production effect annihilation photons is defined as $\epsilon\_pair$.

Thereby, in an exemplary embodiment of the present invention, the ratio of the pair production effect annihilation photon count to the Compton-effect scattering photon count may be calculated by a following formula (1) or a following formula (2):

$$Zpc=(Pair1/\epsilon\_pair)/[(PB11-Pair1/\epsilon\_pair)/\epsilon\_b] \quad (1)$$

$$Zpc=(Pair1/\epsilon\_pair)/[(PC11-Pair1/\epsilon\_pair)/\epsilon\_c] \quad (2)$$

wherein,

Zpc is the ratio of the pair production effect annihilation photon count to the Compton-effect scattering photon count;

Pair1 is the coincidence counter count;

$\epsilon\_pair$ is the detection efficiency of the first and second scattering detector modules to the pair production effect annihilation photons;

PB11 is the first scattering counter count;

$\epsilon\_b$ is the detection efficiency of the first scattering detector module for the Compton-effect scattering photons;

PC11 is the second scattering counter count;

$\epsilon\_c$ is the detection efficiency of the second scattering detector module for the Compton-effect scattering photons.

Please be noted that the value Pair1/$\epsilon\_pair$ in the formula (1) or (2) may be larger than the numbers of pair production effect annihilation photons generated in practice, because two photons of 511 KeV generated between the Compton scattering photons, or between the Compton scattering photon and the pair production effect annihilation photon, or by inhomogeneous positive electrons may also be regarded as pair production effect annihilation photons of 511 KeV. In order to avoid this problem, it needs to increase the time resolution ability of the coincidence counting system in FIG. 7, and the time resolution ability is mainly depended on following factors:

1) Luminous Time of the Detector

In an exemplary embodiment of the present invention, the plastic scintillator detector may be selected, because its luminous time is in the order of nanosecond, 2) Difference in Pulse Voltage Signal Levels Output by the Detectors after the Gamma Photons are Detected In an exemplary embodiment of the present invention, because it adopts constant fraction discriminators, the influence of the difference in pulse voltage signals output by the detectors after the gamma photons are detected may be omitted.

3) Difference in Pulse Voltage Signal Shapes Output by the Detectors after the Gamma Photons are Detected This factor can be well resolved by suitably considering the package and light reflex of the Detector and the like.

4) Resolution Time of the Time Coincidence Circuit

The resolution time of the time coincidence circuit should be set as smallest as possible.

Those skilled in the nuclear technical field should know how to adjust the above factors to increase the time resolution ability of the coincidence counting system based on conventional experiments. Accordingly, further description on this is omitted.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An article inspection device, comprising:
   a x-ray machine;
   a collimation unit for shaping x-rays generated by the x-ray machine into a sector beam to project an article;
   a transmission detector array for detecting the x-rays transmitting through the article so as to form a two-dimensional image of the article; and
   at least one scattering detector array each comprising a plurality of same scattering detector modules arranged in a matrix of i-rows and j-columns,
   wherein a transmission cross section of the article transmitted by the x-rays is divided into a plurality of same sub-regions arranged in a matrix of i-rows and j-columns,
   wherein the plurality of scattering detector modules arranged in i-rows and j-columns correspond to the plurality of sub-regions arranged in i-rows and j-columns one by one for detecting pair production effect annihilation photons and Compton-effect scattering photons from the respective sub-regions produced by the x-rays,
   wherein obtaining atomic numbers of the respective sub-regions based on a ratio of the pair production effect annihilation photon count to the Compton-effect scattering photon count, so as to form a three-dimensional image of the article,
   wherein 'i' is a positive integer equal to or greater than 2, and 'j' is a positive integer equal to or greater than 2.

2. The article inspection device according to claim 1, comprising two scattering detector arrays composed of:
a first scattering detector array having a plurality of same first scattering detector modules arranged in a matrix of i-rows and j-columns; and
a second scattering detector array having a plurality of same second scattering detector modules arranged in a matrix of i-rows and j-columns.

3. The article inspection device according to claim 2, further comprising:
a plurality of coincidence counters corresponding to the plurality of sub-regions arranged in i-rows and j-columns one by one, wherein when one of the first scattering detector modules and one of the second scattering detector modules corresponding to a same one sub-region 'almost simultaneously' receive the photon from the same one sub-region, the coincidence counter corresponding to the same one sub-region is added by '1', wherein the term 'almost simultaneously' means that the time difference between a time when the first scattering detector module receives the photon and a time when the second scattering detector module receives the photon is within a predetermined range; and
a plurality of first scattering counters corresponding to the plurality of sub-regions arranged in i-rows and j-columns one by one, wherein when one of the first scattering detector modules corresponding to one sub-region receives the photon from the one sub-region, the first scattering counter corresponding to the one sub-region is added by '1'.

4. The article inspection device according to claim 3, further comprising:
a plurality of second scattering counters corresponding to the plurality of sub-regions arranged in i-rows and j-columns one by one, wherein when one of the second scattering detector modules corresponding to one sub-region receives the photon from the one sub-region, the second scattering counter corresponding to the one sub-region is added by '1'.

5. The article inspection device according to claim 4, wherein
the first scattering detector module and the second scattering detector module corresponding to the same one sub-region are respectively connected to a first constant timing discriminator and a second constant fraction discriminator for converting a first analog signal detected by the first scattering detector module and a second analog signal detected by the second scattering detector module into a first time signal and a second time signal;
the first time signal and the second time signal are respectively input to the first scattering counter and the second scattering counter corresponding to the same one sub-region;
the first time signal and the second time signal are both input to a time coincidence circuit corresponding to the same one sub-region, the time coincidence circuit determining whether the first time signal and the second time signal are 'almost simultaneously' input to it, and when the first time signal and the second time signal are 'almost simultaneously' input to the time coincidence circuit, the time coincidence circuit outputs a time coincidence signal to the coincidence counter corresponding to the same one sub-region.

6. The article inspection device according to claim 4, wherein the ratio of the pair production effect annihilation photon count to the Compton-effect scattering photon count is calculated by a following formula (1) or a following formula (2):

$$Zpc=(Pair1/\epsilon\_pair)/[PB11-Pair1/\epsilon\_pair)/\epsilon\_b] \quad (1)$$

$$Zpc=(Pair1/\epsilon\_pair)/[PC11-Pair1/\epsilon\_pair)/\epsilon\_c] \quad (2)$$

wherein,
Zpc is the ratio of the pair production effect annihilation photon count to the Compton-effect scattering photon count;
Pair1 is the coincidence counter count;
$\epsilon\_pair$ is an inspection efficiency of the first and second scattering detector modules for the pair production effect annihilation photons;
PB11 is the first scattering counter count;
$\epsilon\_b$ is a detection efficiency of the first scattering detector module for the Compton-effect scattering photons;
PC11 is the second scattering counter count;
$\epsilon\_c$ is a detection efficiency of the second scattering detector module for the Compton-effect scattering photons.

7. The article inspection device according to claim 4, wherein
each of the first scattering detector modules is same as each of the second scattering detector modules; and
each of the scattering detector modules comprises:
a detector; and
a collimator for absorbing the pair production effect annihilation photons and the Compton-effect scattering photons from other sub-regions not corresponding to the collimator to permit only the pair production effect annihilation photons and the Compton-effect scattering photons from the one sub-region corresponding to the collimator to enter the detector.

8. The article inspection device according to claim 7, wherein the detector is a plastic scintillator detector, a liquid scintillator detector, a LaBr$_3$(Ce) detector, a LaCl$_3$(Ce) detector, a HPGe detector or a CdZnTe detector.

9. The article inspection device according to claim 7, wherein the collimator is made of lead, steel or copper.

10. The article inspection device according to claim 7, wherein each of the scattering detector modules further comprises:
a shield for preventing the pair production effect annihilation photons and the Compton-effect scattering photons, from sub-regions not corresponding to the collimator of the scattering detector module, from entering the detector.

11. The article inspection device according to claim 10, wherein the shield is made of lead, steel or copper.

12. The article inspection device according to claim 10, wherein each of the scattering detector modules further comprises:
a hardenite for decreasing the intensity of the pair production effect annihilation photons and the Compton-effect scattering photons from the one sub-region corresponding to the collimator of the scattering detector module.

13. The article inspection device according to claim 12, wherein the hardenite is made of lead, steel or copper.

14. The article inspection device according to claim 12, wherein
the detector is located in a collimation slit of the collimator;
the shield is disposed at one side of the collimator opposite to the article, and seals an opening of the collimation slit at the one side; and the hardenite is disposed at the other side of the collimator facing the article, and seals the other opening of the collimation slit at the other side.

15. The article inspection device according to claim 14, wherein the shield and the collimator are formed into a piece.

16. The article inspection device according to claim 1, wherein the x-ray machine is a monoenergetic x-ray machine or a polyenergetic x-ray machine.

17. The article inspection device according to claim 1, wherein the x-rays generated by the x-ray machine have energy of more than 1.022 MeV.

18. An article inspection method, comprising:
    detecting an attenuation information of x-rays transmitting through an article by use of a transmission detector array, and detecting pair production effect annihilation photon count and Compton-effect scattering photon count during the x-rays transmits through the article by use of at least one scattering detector array; and
    forming a two-dimensional image of the article based on the detected attenuation information, and forming a three-dimensional image of the article based on a ratio of the pair production effect annihilation photon count to the Compton-effect scattering photon count.

* * * * *